(12) United States Patent
Hahn et al.

(10) Patent No.: US 10,006,132 B2
(45) Date of Patent: Jun. 26, 2018

(54) ELECTROLYSIS STACK AND ELECTROLYZER

(71) Applicant: Siemens Aktiengesellschaft, München (DE)

(72) Inventors: Alexander Hahn, Röttenbach (DE); Jochen Herold, Weismain (DE); Jens Weidauer, Fürth (DE)

(73) Assignee: SIEMENS AKTIEGESELLSCHAFT, München (DE)

( * ) Notice: Subject to any disclaimer, the term of this patent is extended or adjusted under 35 U.S.C. 154(b) by 445 days.

(21) Appl. No.: 14/777,993

(22) PCT Filed: Feb. 28, 2014

(86) PCT No.: PCT/EP2014/053947
§ 371 (c)(1),
(2) Date: Sep. 17, 2015

(87) PCT Pub. No.: WO2014/146885
PCT Pub. Date: Sep. 25, 2014

(65) Prior Publication Data
US 2016/0281248 A1    Sep. 29, 2016

(30) Foreign Application Priority Data

Mar. 19, 2013    (DE) .................. 10 2013 204 758
Aug. 21, 2013    (EP) ......................... 13181180

(51) Int. Cl.
*C25B 15/02* (2006.01)
*C25B 9/04* (2006.01)
(Continued)

(52) U.S. Cl.
CPC ............ *C25B 15/02* (2013.01); *C25B 9/04* (2013.01); *C25B 9/18* (2013.01); *C25B 15/00* (2013.01);
(Continued)

(58) Field of Classification Search
CPC ....................................................... C25B 15/02
See application file for complete search history.

(56) References Cited

U.S. PATENT DOCUMENTS

| 4,310,605 A | 1/1982 | Early et al. |
| 8,936,704 B1 * | 1/2015 | Li .................. C25B 9/045 204/229.8 |

(Continued)

FOREIGN PATENT DOCUMENTS

| JP | H03189372 | 8/1991 |
| JP | H09 327178 | 12/1997 |

(Continued)

OTHER PUBLICATIONS

International Search Report issued by the European Patent Office in International Application PCT/EP2014/053947.
(Continued)

*Primary Examiner* — Nicholas A Smith
(74) *Attorney, Agent, or Firm* — Henry M Feiereisen LLC

(57) ABSTRACT

An electrolysis stack for an electyrolyzer is electrically subdivided into a plurality of segments, each segment including a specific number of electrolysis cells. The electrolysis stack further has switches adapted for electrically short circuiting the segments of the electrolysis stack.

18 Claims, 3 Drawing Sheets

(51) Int. Cl.
  *C25B 1/04*    (2006.01)
  *C25B 15/00*   (2006.01)
  *C25B 9/18*    (2006.01)

(52) U.S. Cl.
  CPC ............ *C25B 1/04* (2013.01); *Y02E 60/366*
         (2013.01); *Y02P 20/133* (2015.11)

(56) References Cited

U.S. PATENT DOCUMENTS

| | | | |
|---|---|---|---|
| 9,428,839 B1* | 8/2016 | Li | ............................ C25B 9/04 |
| 2006/0246331 A1 | 11/2006 | Steinbroner | |
| 2011/0155583 A1* | 6/2011 | Li | ............................ C25B 1/04 |
| | | | 205/637 |
| 2011/0200899 A1 | 8/2011 | Mata et al. | |
| 2012/0202279 A1 | 8/2012 | Murahara | |

FOREIGN PATENT DOCUMENTS

| | | |
|---|---|---|
| JP | 2003/288935 | 10/2003 |
| JP | 2005/204485 | 7/2005 |
| JP | 2007/250689 | 9/2007 |
| JP | 2013/049600 | 3/2013 |
| WO | WO 2008/142995 | 11/2008 |

OTHER PUBLICATIONS

"EE-Gas", aus Wikipedia, der freien Enzykiopädie, http://de.wikipedia.org/wiki/EE-Gas, pp. 1-12.

"Elektrolyseur", aus Wikipedia, der freien Enzyklopädia, http://de.wikipedia.org/wiki/Elektrolyseur, pp. 1-3.

\* cited by examiner

ELECTROLYSIS STACK AND ELECTROLYZER

CROSS-REFERENCES TO RELATED APPLICATIONS

This application is the U.S. National Stage of International Application No. PCT/EP2014/053947, filed Feb. 28, 2014, which designated the United States and has been published as International Publication No. WO 2014/146885 and which claims the priority of German Patent Application, Serial No. 10 2013 204 758.4, filed Mar. 19, 2013, and European Patent Application Serial No 13181180.4, filed Aug. 21, 2013 pursuant to 35 U.S.C. 119(a)-(d).

BACKGROUND OF THE INVENTION

The invention relates to an electrolysis stack for an electrolyzer, said electrolysis stack having a plurality of electrolysis cells. It further relates to an electrolyzer, and to an energy supply system comprising such an electrolyzer and a renewable energy source that is connected to the electrolyzer.

An electrolyzer is known from http://de.wikipedia.org/wiki/Elektrolyzeur (available on Jul. 15, 2013) and is a device which brings about a conversion of materials with the aid of an electric current (electrolysis). Given the wide variety of different types of electrolysis, there also exists a multiplicity of electrolyzers, such as e.g. an electrolyzer for hydrogen electrolysis.

In the case of such an electrolyzer for hydrogen electrolysis, known embodiments of which include alkaline electrolyzers or acid or PEM electrolyzers, water is broken down into hydrogen and oxygen.

Current thinking (http://de.wikipedia.org/wiki/EE-Gas, available on Jul. 15, 2013) relates to the use of surplus energy from renewable energy sources, as in times of above average solar power or wind power generation in corresponding installations, to drive electrolyzers for the purpose of producing so-called EE gas.

In this case, a (hydrogen electrolysis) electrolyzer which is attached to the renewable energy source first generates hydrogen using the energy from the renewable energy source, and said hydrogen is then used in a Sabatier process with carbon dioxide to produce methane. The methane can then be fed into an existing natural gas network, for example, and therefore allows energy to be stored and transported to the consumer and can therefore reduce the load on an electricity network. Alternatively, the hydrogen which is generated by the (hydrogen electrolysis) electrolyzer can also be reused directly, e.g. for a fuel cell.

An electrolyzer usually consists of a plurality of electrolysis cells which are electrically connected in series and combined to form an electrolysis stack, or respectively to form a plurality of electrolysis stacks which are interconnected in series or in parallel. The number and type of electrolysis cells and their interconnection are determined by a specific (U-I) characteristic curve of the electrolyzer in this case.

In this case, an electrolysis cell in turn consists of an anode and a cathode. In the case of an alkaline electrolysis cell, an electrolyte, usually potassium hydroxide solution, and a separator are situated between the anode and the cathode. In the case of a PEM electrolysis cell, a gastight polymer electrolyte membrane is situated between the anode and the cathode.

The electrolyzer requires a DC voltage for operation.

If energy is supplied to an electrolyzer via an AC voltage network or a three-phase voltage network, use of a converter is therefore necessary. Using this converter, the DC voltage level can be controlled and a working point of the electrolyzer can then be adjusted according to its characteristic curve.

If electrical energy is supplied to an electrolyzer by a renewable energy source, i.e. the electrolyzer and the renewable energy source are connected together via a shared DC voltage rail in this case, it can also be operated without the use of a converter as a control means.

For example, an electrolyzer can be attached directly via the shared DC voltage rail to the direct current supply of a photovoltaic field (PV field), i.e. to PV generators composed of interconnected PV modules, without any need for a connection to an electricity network via a photovoltaic inverse rectifier in this case.

If an electrolyzer is connected via the shared DC voltage rail to the renewable energy source/DC voltage source, e.g. the PV field (a direct current generator of a wind energy installation, referred to simply as wind energy installation below, is also possible here), a shared working point of renewable energy source and electrolyzer is established on the shared DC voltage rail.

This shared working point of electrolyzer and renewable energy source/PV field/wind energy installation (both together also referred to simply as energy supply system below) is produced as illustrated in FIG. 1 as an intersection point of a (specific) I-U characteristic curve of the renewable energy source/PV field (continuous curve; current I and voltage U, also referred to simply as characteristic curve below) and the I-U characteristic curve of the electrolyzer (dashed curve; current I and voltage U).

In this case, the characteristic curve of the renewable energy source, e.g. the PV field or the wind energy installation, is not fixed, but is influenced by (environmental) parameters. For example, the characteristic curve of a PV field depends on strength of Insolation on the PV field, environmental temperature at the PV field, PV cell surface with which the PV field operates, and aging of the PV field.

Corresponding environmental parameters which influence the characteristic curve are also known for other renewable energy sources, e.g. wind strength in the case of the wind energy installation.

It is also shown in FIG. 1 that the characteristic curve of the (in this case) PV field has a point, a so-called MPP (maximum power point), at which the PV field or the renewable energy source delivers a maximum power yield (maximum power). The MPP also moves with changing environmental parameters.

In order to achieve maximum possible power yield, the renewable energy source is preferably operated in the region of its MPP (which changes in response to changing environmental parameters). Simply expressed, working point and MPP should correspond whenever possible.

If the renewable energy source is connected to the electrolyzer via the DC voltage rail, and the shared working point of renewable energy source and electrolyzer is therefore established via the DC voltage rail as a shared intersection point of both characteristic curves, it is also desirable here for the shared working point to lie in the region of the (changing) MPP of the renewable energy source, and therefore in the region of the maximum power of the energy source.

It is known that corresponding agreement or matching of the shared working point for optimum operation of renewable energy source and electrolyzer (or of the energy supply system) can be achieved by means of a DC-DC regulator. However, this has the disadvantage that such a DC-DC regulator is cost-intensive and is or may be susceptible to error.

SUMMARY OF THE INVENTION

The object of the invention is therefore to propose an electrolyzer which overcomes the disadvantages of the prior art. In particular, in the context of an energy supply system of the type cited above, the invention is intended to ensure that the operation of the relevant electrolyzer is as close as possible to the MPP of the renewable energy source.

The object is achieved by an electrolysis stack for an electrolyzer having a plurality of electrolysis cells, an electrolyzer, and an energy supply system having such an electrolyzer and a renewable energy source connected to the electrolyzer, having the features of the respective independent claim.

Provision is made for the inventive electrolysis stack having a plurality of electrolysis cells to be electrically subdivided into a plurality of segments, each of which comprises a specific number of the electrolysis cells and can be electrically short-circuited by switching means ("switchable) segmented electrolysis stack").

In an electrolyzer according to the invention, provision is made for at least one such electrolysis stack comprising the segments that can be short-circuited ("electrolyzer with (switchable) segmented electrolysis stack").

The electrolyzer may also comprise a plurality of such electrolysis stacks, each featuring the segments that can be short-circuited. These electrolysis stacks can then be connected/interconnected in parallel and/or in series ("electrolyzer with (switchable) segmented electrolysis stacks").

In a further electrolyzer according to the invention, provision is made for series-connecting a plurality of electrolysis stacks to form at least one string. Provision is then further made here for switching means which can be used to electrically short-circuit one of the electrolysis stacks that are connected in series to form the at least one string, or a plurality of the electrolysis stacks that are connected in series to form the at least one string ("electrolyzer with switchable electrolysis stacks").

In a further electrolyzer according to the invention, provision is made for parallel-connecting a plurality of strings, each of which comprises a plurality of electrolysis stacks that are connected in series. Provision is then further made here for switching means which can be used to (electrically) switch in/out one of the strings or a plurality of the strings ("electrolyzer with switchable strings").

"Electrolyzer with switchable electrolysis stacks" and "electrolyzer with switchable strings" can be combined to form a matrix structure for an electrolyzer. Individual, some, or all electrolysis stacks can also be designed as "(switchable) segmented electrolysis stacks" in this case.

With regard to the inventive energy supply system, provision is made for the inventive electrolyzer to be attached to a renewable energy source such as a photovoltaic installation or a wind energy installation.

According to the invention, in order to protect the energy supply system or the electrolyzer, the electrolyzer or the number of electrolysis cells therein can be tuned in such a way that a maximum operating voltage of the electrolysis is greater than or equal to the maximum voltage of the renewable energy source.

The invention is based on the idea or the generic inventive concept that, by means of selectively changing or varying the (U-I) characteristic curve of an electrolyzer, it is possible (selectively) to change and therefore (selectively) to adjust its working/operating points.

If it is possible thus to model or adjust the characteristic curve of an electrolyzer in a changeable/variable manner ("power adaptation"), it is then possible, i.e. by means of changing/adjusting the characteristic curve of the electrolyzer or by virtue of its power adaptation, to ensure optimum compatibility between the electrolyzer and a system which is connected to and drives the electrolyzer, such as in particular an energy source supplying DC voltage, e.g. a renewable energy source, such that the common working point of both systems lies in the region of maximum power or MPP of the system which is connected to and drives the electrolyzer (matching an electrolyzer voltage/electrolysis stack voltage with a voltage of the system which drives the electrolyzer, or an "optimized system balance" produced by a common working point in the region of the MPP of the system which drives the electrolyzer), without requiring electronics such as additional converters, inverse rectifiers and/or DC-DC regulators for this purpose. It is thereby possible to minimize costs and/or risk of error.

This flexibility achieved by the invention in respect of the power adaptation or adjustment of the characteristic curve of the electrolyzer, and the optimized system balance which is therefore possible between the electrolyzer and another system, is particularly advantageous if the electrolyzer is driven by a system which supplies electric energy and whose characteristic curve likewise varies, particularly in response to changing environmental parameters, as in the case of e.g. renewable energy sources.

Expressed in simple and clear terms, this inventive change/variation/adjustment of a characteristic curve can be realized because the electrolysis stack of an electrolyzer has individually switchable segments, wherein switching such a segment allows it to be electrically short-circuited or electrically bridged ("(switchable) segmented electrolysis stack").

If—as a result of corresponding switching—the number of "active" electrolysis cells in the electrolysis stack changes with the one or more short-circuited/bridged segments of the electrolysis stack, the characteristic curve of the electrolyzer is also changed thereby, as are its working points. In other words, the electrolysis stack voltage can be varied selectively.

Again expressed in simple and clear terms, this inventive change/variation/adjustment of a characteristic curve can also be realized, in an electrolyzer having a plurality of electrolysis stacks that are connected in series to form a string, because one or more of these electrolysis stacks can be electrically short-circuited or bridged ("electrolyzer with switchable electrolysis stack").

If—as a result of corresponding switching—the number of "active" electrolysis cells in the electrolyzer changes likewise here with the one or more short-circuited/bridged electrolysis stacks of the string, the characteristic curve of the electrolyzer is likewise changed thereby, as are its working points. In other words, the electrolyzer voltage can be varied selectively.

Moreover, again expressed in simple and clear terms, this inventive change/variation/adjustment of a characteristic curve can also be realized, in an electrolyzer having a plurality of parallel-connected strings which comprise in each case a plurality of series-connected electrolysis stacks, because one or more of these strings can be electrically switched in/out ("electrolyzer with switchable strings"/"in/out switching of strings").

If—as a result of corresponding switching—the number of "active" electrolysis cells in the electrolyzer changes likewise here with the one or more switched in/out strings of the electrolyzer, the characteristic curve of the electrolyzer is likewise changed thereby, as are its working points. In other words, the electrolyzer voltage can be varied selectively.

If it is very easily possible by virtue of the invention to change the characteristic curve of an electrolyzer in a flexible manner, it is therefore possible in a very simple and flexible manner to ensure optimum compatibility between an electrolyzer and an energy source which supplies a DC voltage and drives the electrolyzer, by correspondingly switching the switching means for the electrolysis stack/electrolyzer.

In this context, the invention can also dispense with complex and expensive power electronics such as DC-DC regulators and the like, thereby allowing economical stand-alone operation of the energy source, e.g. a regenerative energy installation (photovoltaic/wind power installation), is small and compact, and moreover allows the production of an energy carrier such as e.g. hydrogen as a result of the electrolysis in the electrolyzer.

Preferred developments of the invention are derived from the dependent claims and/or from explanatory matter below.

In order to realize this electrical (in/out) switching of the segments or the electrolysis stacks or the strings, such that they can be short-circuited/bridged/switched in/out, it is preferably possible to provide switches that are based on a power semiconductor, in particular semiconductor switches, e.g. in the form of an IGBT. In other words, the switching means can preferably be switches that are based on a power semiconductor, in particular semiconductor switches. Such switches are well tested, standardized and economical.

Mechanical switches or a combination of electrical and mechanical switches are also conceivable.

The segmentation in the electrolysis stack can preferably be achieved by attaching line adapters to electrode plates, in particular to (optionally modified) bipolar plates having sufficiently high transverse conductivity, of the electrolysis stack. In a specifically preferred embodiment, particularly if the transverse conductivity of the electrode plates is too low, the segmentation can be achieved by incorporating current discharge plates into the electrolysis stack.

Furthermore, provision can preferably be made for the switching means or the switch to be in thermal contact with the segmentation means which effect the segmentation, e.g. with the current discharge plate which is incorporated in the electrolysis stack, with the electrode plate, or with the line adapter that is attached to the electrode plate. The segmentation means can therefore concurrently act as a heat sink for the switching means or the switch. Moreover, the resulting electrolysis stack and/or electrolyzer is therefore extremely compact.

It is also possible for the number of electrolysis cells in the segments to differ in each case. In a specifically preferred embodiment, it is further possible for the number of electrolysis cells to form a mathematical sequence according to the following formula:

$$a*(2^x)$$

(where a=a natural number and x=the number of segments). It is thereby possible to adapt a voltage of the electrolysis stack in a very flexible manner while using a minimum number of segments.

For example, selecting a=1 and x=5 produces a segmentation of segments or electrolysis cell groups of 2, 4, 8, 16 and 32 electrolysis cells. By means of switching or short-circuiting/bridging individual segments/electrolysis cell groups, it is therefore possible to set a total of 32 different voltage values via the segmentation.

Provision can also be made for the electrolysis stack to comprise a segmented region (which includes segmentation) and a non-segmented (static) region.

Furthermore, provision can preferably be made for the segmented region to comprise approximately ¼ to ⅓ of the electrolysis stack in this case, in particular approximately ¼ or approximately ⅓ of the electrolysis stack. Correspondingly, provision can preferably be made likewise for the non-segmented/static region to comprise ⅔ to ¾ of the electrolysis stack, in particular approximately ⅔ or approximately ¾ of the electrolysis stack.

Furthermore, provision can be made for the electrolysis stack to have approximately 100 to 400 electrolysis cells and in particular, as normal, approximately 200 to 300 electrolysis cells.

Therefore a (normal) electrolysis stack with e.g. 250 electrolysis cells will have a segmented region of approximately 40 to 85 electrolysis cells and a static/non-segmented region of approximately 165 to 210 electrolysis cells.

Therefore the (normal) electrolysis stack having e.g. 250 electrolysis cells and an approximate cell voltage of approximately 2.2 V will, with corresponding dimensioning of the segmented/static region, have a control range of approximately 300 V to 550 V.

As a result of the "uneven" segmentation (of the segmented region of the electrolyzer) in combination with the subdivision of the electrolyzer into the segmented and the non-segmented region, it is then possible optimally to represent the demands of the energy source driving the electrolyzer, providing a staged control of the overall system comprising electrolyzer and energy source.

It is moreover also possible to provide an electrolyzer in which at least one such inventive segmented electrolysis stack, and in particular a plurality of inventive segmented electrolysis stacks which are parallel-connected in particular, are assembled together with non-segmented electrolysis stacks, by means of parallel connection in particular.

While approximately 100 to 400 and in particular approximately 200 to 300 electrolysis cells can be assembled in the segmented electrolysis stack according to the invention, allowing (voltage) control ranges between approximately 300 V and 550 V to be realized, it can be effective to assemble approximately 10 to 20 electrolysis cells in the case of a non-segmented electrolysis stack. This can then be operated at voltages between 20 V and 50 V.

Furthermore, a recording unit for recording a number of operating hours of at least some of the electrolysis stacks may also be provided for the electrolyzer.

Moreover, the recording unit can also be configured to record power-related measurement data, such as an effective power or other related measurement data, e.g. a DC voltage and a DC current of the energy source or a production volume of hydrogen/electrolysis cell.

The recording unit can also be configured to record environmental parameters, in particular at the energy source, such as e.g. insolation or temperature at a PV installation.

Furthermore, the recording unit can be configured to calculate a current MPP from a characteristic curve of the energy source.

A control unit can also be provided for the purpose of controlling the switching means, and therefore for the purpose of short-circuiting, switching in/out or bridging the segments/electrolysis stacks/strings, wherein the control unit can be configured in particular such that the control (of the switching means) is effected by the control unit on the basis of the power-related measurement data and/or as a function of the recorded number of operating hours and/or the calculated current MPP.

In particular, on the basis of the recorded operating hours, it is thereby possible to achieve "uniform" short-circuiting, switching in/out or bridging (i.e. uniform activation) across all or over the segments/electrolysis stacks/strings, and therefore uniform (component) wear.

This allows the service life of the electrolyzer to be extended.

In a specifically preferred embodiment, the electrolyzer is an alkaline electrolyzer or an acid or PEM elctrolyzer. The electrolyzer can however be directly connected to any type of energy source supplying a DC voltage. In a specifically preferred embodiment, the energy source is a renewable/regenerative energy source In a specifically preferred embodiment, the renewable energy source is a regenerative electric generator, in particular a photovoltaic installation or a wind power installation.

The foregoing description of advantageous embodiments of the invention contains numerous features, which are to some extent repeated in combination in the individual subclaims. However, for the purposes of the invention, these features will also be considered individually by a person skilled in the art and used together to form further suitable combinations.

BRIEF DESCRIPTION OF THE DRAWING

The properties, features and advantages of the invention described above, and the manner in which these are achieved, become clearer and more comprehensible in connection with the following description of the exemplary embodiments, these being explained in further detail in connection with the figures.

However, neither the invention nor the functional features thereof are restricted to the combinations of features specified in the exemplary embodiments. Therefore suitable features of any one exemplary embodiment may also be considered explicitly in isolation, taken from one exemplary embodiment and introduced into another for the enhancement thereof.

Figure 1:
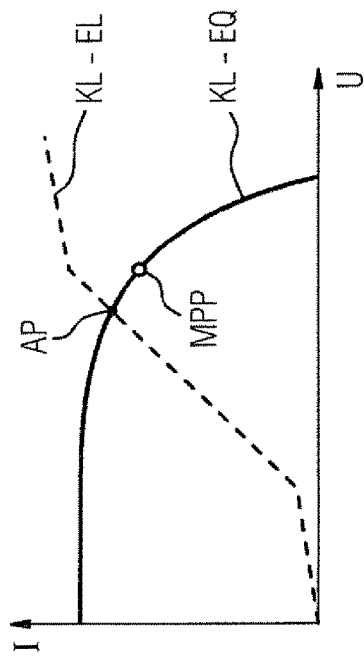
Figure 2:
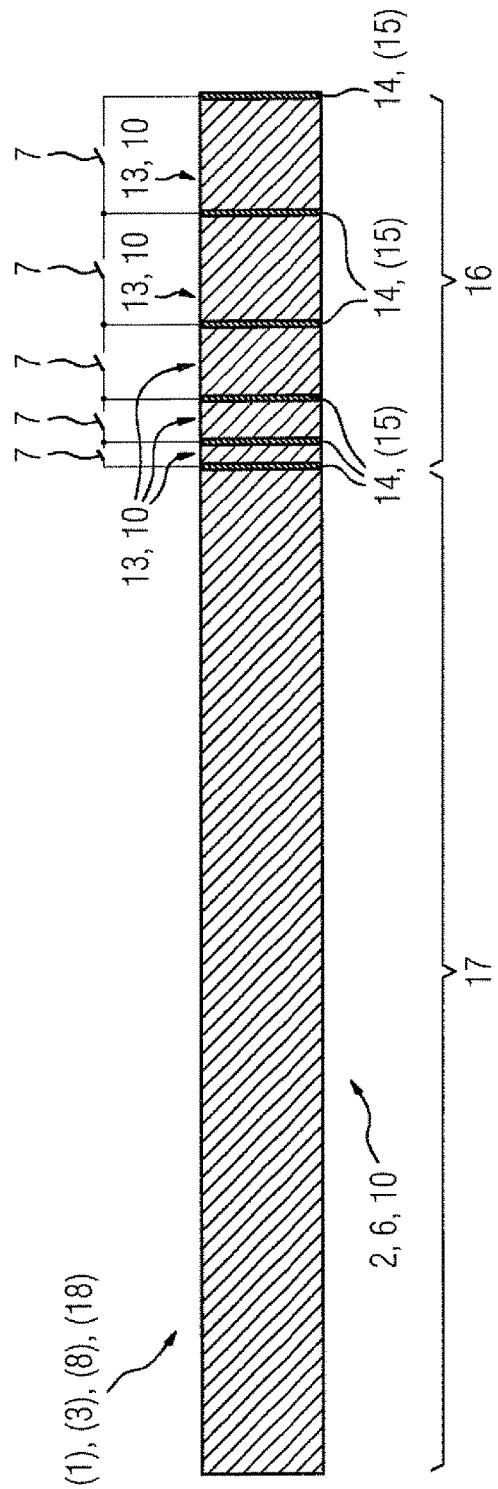
Figure 3:
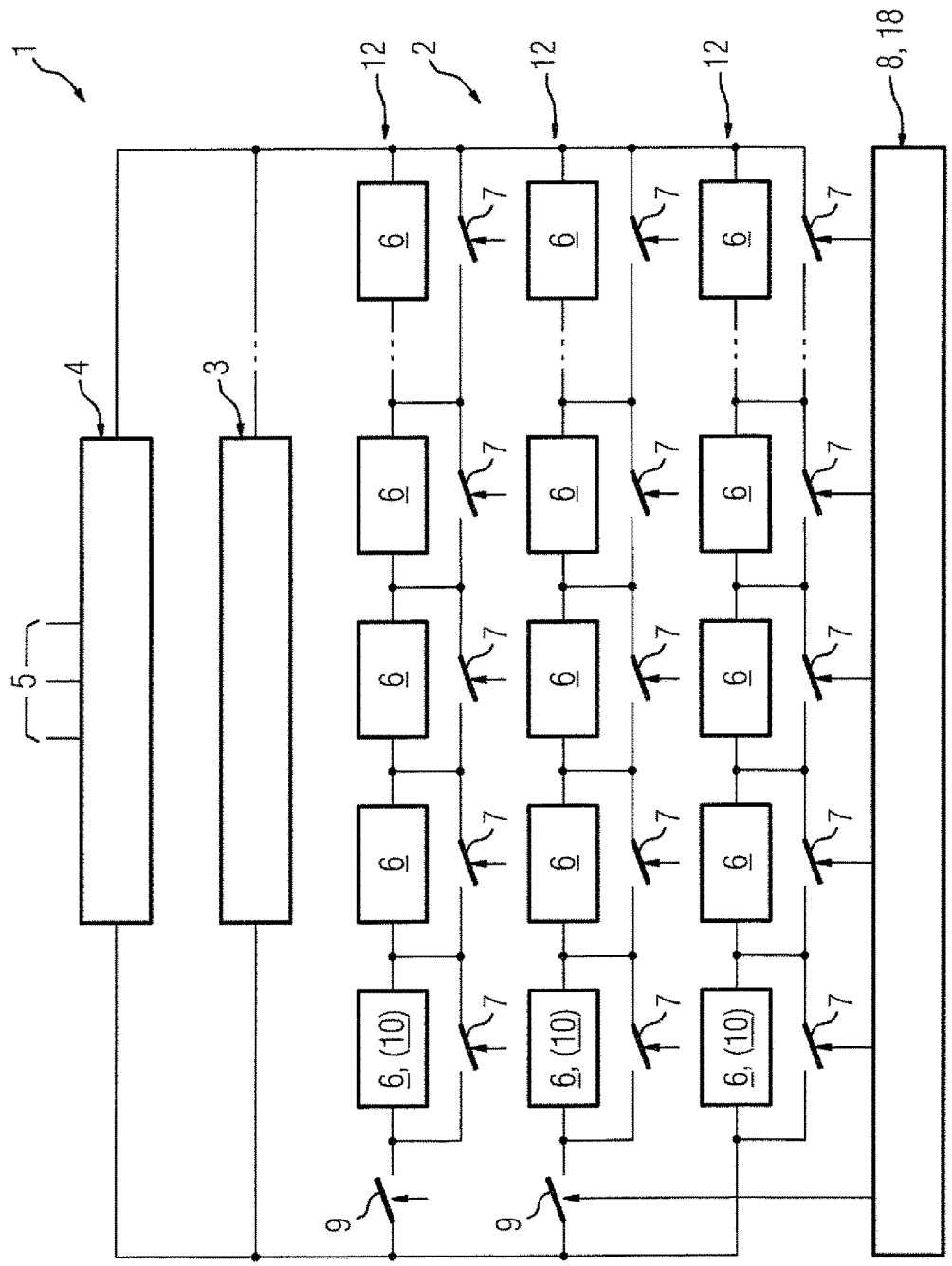
Figure 4:
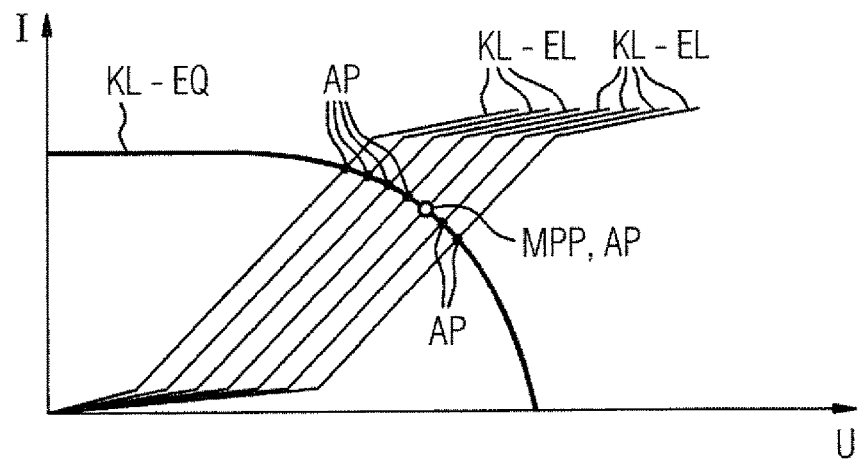
Figure 5:
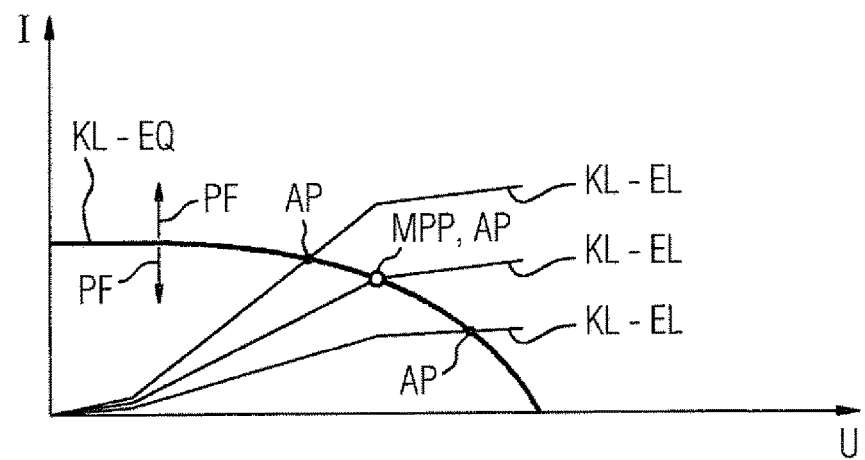

Elements or components having identical function or structure are denoted by identical reference signs in the exemplary embodiments and figures, in which:

FIG. 1 shows an I-U diagram comprising the characteristic curves of an energy source and an electrolyzer, FIG. 2 shows an electrolysis stack of an electrolyzer according to an exemplary embodiment, FIG. 3 shows an equivalent circuit diagram comprising a renewable energy source and a directly attached electrolyzer with a plurality of strings, each of which has a plurality of electrolysis stacks, according to an exemplary embodiment, FIG. 4 shows an I-U diagram comprising the characteristic curve of an energy source and a plurality of characteristic curves of an electrolyzer with different serial connections of electrolysis stacks, and FIG. 5 shows an I-U diagram comprising the characteristic curve of an energy source and a plurality of characteristic curves of an electrolyzer with different parallel connections of strings.

DETAILED DESCRIPTION OF PREFERRED EMBODIMENTS

"(Switchable) segmented electrolysis stack of an electrolyzer" (FIG. 2)

FIG. 2 shows one of a plurality of controllable electrolysis stacks 6, these having an identical structure in each case and being interconnected in parallel, of a (here) PEM electrolyzer 2 for hydrogen electrolysis (subsequently referred to simply as electrolyzer 2).

The electrolyzer 2 is directly attached (not shown) to a regenerative energy source 3, here a photovoltaic installation or a photovoltaic field (abbreviated as PV installation or PV field respectively) 3, by means of which it is supplied with DC voltage that produces the hydrogen electrolysis in the electrolyzer 2.

The electrolysis stacks 6 are each, or the single electrolysis stack 6 shown in FIG. 2 is, constructed from a multiplicity of electrolysis cells 10, here a total of 250 electrolysis cells 10, which are electrically connected in series.

The total number of all electrolysis cells 10 of the electrolyzer 2 coordinated such that the maximum operating voltage of the electrolysis is greater than or equal to the maximum PV voltage of the PV field.

In this case, the electrolysis cell 10 itself consists of an anode and a cathode in the form of bipolar plates 15 and a polymer electrolyte membrane which is disposed between them.

It can also be seen from FIG. 2 that the electrolysis stack 6 has a segmented region 16 and a non-segmented static region 17 with electrolysis cells 10 grouped therein, wherein the segmented region comprises approximately 25% of the electrolysis stack 6, i.e. 25% of all electrolysis cells 10 of the electrolysis stack 6.

A total of five segments 13 (electrolysis cell groups 13), each grouping a different number of electrolysis cells 10, are formed in the segmented region 16 of the electrolysis stack 6.

The number of electrolysis cells 10 in the respective segment 13 is dimensioned according to a mathematical sequence using the following (general) formula:

$$a*(2^x)$$

(where a=a natural number and x=the number of segments), wherein a=1 and x=5 (i.e. five segments 13) has been realized here.

This results in the segmentation 13 comprising the five segments 13 or electrolysis cell groups 13 of 2, 4, 8, 16 and 32 electrolysis cells 10.

The segmentation 13 for the electrolysis cells 10 of the segmented region 16 of the electrolysis stack 6—into the five segments comprising the 2, 4, 8, 16 and 32 electrolysis cells—is realized by means of current discharge plates 14, which are inserted into the electrolysis stack 6 at corresponding positions.

The segments 13 can be short-circuited/bridged by means of semiconductor switches 11, IGBTs in this case, which can be activated and deactivated in an individually controlled manner, and which are installed directly on the current discharge plates 14.

The electrolysis stack 6 comprising the 250 electrolysis cells 10, and the segmentation 13 into the five segments 13 comprising groups 13 of 2, 4, 6, 16 and 32 electrolysis cells, therefore results in a control range of approximately 300 V to 550 V, for example.

It is thus possible, by means of activating/deactivating or short-circuiting/bridging individual segments 13 or a plurality of segments 13 (in any combination) in a corresponding and controlled manner, to change the number of "active" electrolysis cells 10 of the electrolysis stack 6, and therefore the voltage of the corresponding electrolysis stack 6 (electrolysis stack voltage) and consequently also the voltage of the electrolyzer 2 according to the characteristic curves KL-EL in FIG. 4 (changing/shifting the characteristic curve KL-EL), and it is thereby possible (in a staged manner) to match the PV voltage. In other words, the working point of the electrolyzer 2 can be moved towards the maximum power MPP (maximum power point) of the energy source 3 driving the electrolyzer 2.

If the semiconductor switches 11 are installed directly on the current discharge plates 14 in each case, the respective current discharge plate 14 simultaneously acts as a heat sink for the semiconductor switches 11. The resulting package is therefore particularly compact and a separate switch cooling is not required here.

The control of the switches 11, i.e. the activation and deactivation thereof, which results in the bridging or short-circuiting of the segments 13, is performed by a control unit 8 (not shown).

"Electrolyzer with switchable electrolysis stack and switchable strings" (FIG. 3).

FIG. 3 shows an inventive equivalent circuit diagram of an energy supply system 1 comprising a controllable electrolyzer 2, which is attached directly to a renewable energy source 3 (a photovoltaic field in this case) and, via an inverse rectifier 4, to an electricity network 5.

The electrolyzer 2 is constructed in the form of a matrix from a multiplicity of electrolysis stacks 6, these comprising electrolysis cells 10 arranged in series in this case 15, wherein a plurality of (series-connected) electrolysis stacks 6 form a string 12 and a plurality of strings 12 are connected in parallel.

Provision is further made for an entity, a switching entity comprising various switches 7, 9 in this case, by means of which the characteristic curve of the electrolyzer 2 (KL-EL) can be changed by switching electrolysis stacks 6 and/or strings 12 in and out (cf. FIGS. 4 and 5).

For this, a switch 7 is connected in parallel to each of the electrolysis stacks 6 and can be activated or deactivated via a control unit 8 as per FIG. 3, thereby making a bypass, i.e. a short circuit or bridge for the current, possible parallel to the respective electrolysis stack 6. Alternatively, a plurality of serially connected electrolysis stacks 6 can also be bridged by means of a switch 7.

In this way, the number of series-connected electrolysis stacks 6 and hence the voltage of the relevant string 12 can be changed according to the characteristic curves KL-EL in FIG. 4, whereby the working point can be shifted towards the maximum power MPP (maximum power point).

In order to achieve an adaptation in terms of current, the parallel-connected strings 12 can be switched in and/or out individually by means of switches 9, thereby producing a family of characteristics having the changeable characteristic curves KL-EL for the electrolyzer 2 as per FIG. 5.

The characteristic curve of the electrolyzer 2 (KL-EL) can therefore be adapted to the current characteristic curve of the renewable energy source 3 (KL-EQ) during operation, in order to allow operation at the maximum power MPP (maximum power point) or in the region of the MPP.

For example, shading of a photovoltaic field causes a change of its characteristic curve (shift of the characteristic curve KL-EQ indicated by arrows PF in FIG. 5), wherein it is then advantageous to adapt the working point of the electrolyzer 2 for operation at the maximum power MPP.

The control of the switches 7, 9 of the switching entity (and switches 11) by the control unit 8 may be effected on the basis of power-related measurement data.

The electric switches 7, 9 of the switching entity (and switches 11) may be embodied on the basis of power semiconductors or using semiconductor switches.

Moreover, the number of operating hours of at least some of the electrolysis stacks 6 which can be switched in and/or out may be recorded using a recording unit 18.

This has the advantage of utilizing the service life of the electrolysis stacks 6 in a uniform manner, i.e. by switching in electrolysis stacks 6 having a low number of operating hours and switching out those having a high number of operating hours where possible.

Although the invention is illustrated and described in detail above with reference to the preferred exemplary embodiments, the invention is not restricted by the examples disclosed herein and other variations may be derived therefrom by a person skilled in the art without thereby departing from the scope of the invention.

What is claimed is:

1. An electrolysis stack, comprising:
   a plurality of electrolysis cells;
   current discharge plates inserted into the electrolysis stack so as to electrically subdivide the electrolysis stack into a plurality of segments, each of said segments comprising a specific number of said electrolysis cells; and
   switches in thermal contact with the current discharge plates, said switches being adapted for electrically short circuiting said segments.

2. The electrolysis stack of claim 1, wherein the segments differ with regard to the number of electrolysis cells.

3. The electrolysis stack of claim 1, wherein the number of electrolysis cells forms a mathematical sequence, and is specified in particular according to the following formula:

$$a*(2^x)$$

wherein a is a natural number and x is the number of segments.

4. The electrolysis stack of claim 1, having a segmented region and an un-segmented region, said segmented region being defined by the segments.

5. The electrolysis stack of claim 4, wherein the segmented region comprises approximately ¼ to ⅓ of the electrolysis stack, and wherein the non-segmented region comprises approximately ⅔ to ¾ of the electrolysis stack.

6. The electrolysis stack of claim 4, wherein the segmented region comprises approximately ¼ or approximately ⅓ of the electrolysis stack, and wherein the non-segmented region comprises approximately ⅔ or approximately ¾ of the electrolysis stack.

7. The electrolysis stack of claim 4, wherein the non-segmented region comprises approximately ⅔ to ¾ of the electrolysis stack.

8. The electrolysis stack of claim 4, wherein the non-segmented region comprises approximately ⅔ or approximately ¾ of the electrolysis stack.

9. The electrolysis stack of claim 1, wherein the switch is constructed as a power semiconductor.

10. The electrolysis stack of claim 9, wherein the switch is constructed as a semiconductor switch.

11. The electrolysis stack of claim 1, comprising approximately 100 to 400 of said electrolysis cells, wherein the electrolysis cells are each operable at a voltage between 20 V to 50 V.

12. The electrolysis stack of claim 11, comprising approximately 200 to 300 of said electrolysis cells.

13. An electrolyzer, comprising an electrolysis stack, said electrolysis stack comprising a plurality of electrolysis cells; current discharge plates inserted into the electrolysis stack so as to electrically subdivide the electrolysis stack into a plurality of segments, each of said segments comprising a specific number of said electrolysis cells; and switches in thermal contact with the current discharge plates, said switches being adapted for electrically short circuiting said segments.

14. The electrolyzer of claim 13, comprising a plurality of said electrolysis stack connected in parallel and/or in series to each other.

15. The electrolyzer of claim 13, further comprising:
a recording unit for recording a number of operating hours of at least some of the electrolysis stacks; and
a control unit for controlling the switches, wherein the control unit is configured in particular such that the control is effected by the control unit (8) on the basis of the power-related measurement data and/or as a function of the recorded number of operating hours.

16. The electrolyzer of claim 13, further comprising a control unit for controlling the switches, wherein the control unit is configured such that the control is effected by the control unit as a function of power-related measurement data and/or as a function of a recorded number of operating hours.

17. An energy supply system, comprising:
a renewable energy source; and
an electrolyzer connected to the renewable energy source, said electrolysis stack comprising
a plurality of electrolysis cells,
current discharge plates inserted into the electrolysis stack so as to electrically subdivide the electrolysis stack into a plurality of segments, each of said segments comprising a specific number of said electrolysis cells, and
switches in thermal contact with the current discharge plates, said switches being adapted for electrically short circuiting said segments.

18. The energy supply system of claim 17, wherein the renewable energy source is constructed as a photovoltaic installation or a wind energy installation.

* * * * *